US011955747B2

(12) United States Patent
Brantingham et al.

(10) Patent No.: US 11,955,747 B2
(45) **Date of Patent: *Apr. 9, 2024**

(54) WATERTIGHT ELECTRICAL CONNECTION SYSTEM TO FLAT-WIRE CONDUCTORS OF A FLEXIBLE PRINTED CIRCUIT

(71) Applicant: APTIV TECHNOLOGIES LIMITED, St. Michael (BB)

(72) Inventors: Duane Lee Brantingham, Cortland, OH (US); Michael J. Demonica, Jr., Cortland, OH (US)

(73) Assignee: APTIV TECHNOLOGIES LIMITED, St. Michael (BB)

(*) Notice: Subject to any disclaimer, the term of this patent is extended or adjusted under 35 U.S.C. 154(b) by 0 days.

This patent is subject to a terminal disclaimer.

(21) Appl. No.: 17/124,597

(22) Filed: Dec. 17, 2020

(65) Prior Publication Data

US 2021/0210897 A1 Jul. 8, 2021

Related U.S. Application Data

(60) Provisional application No. 62/956,887, filed on Jan. 3, 2020.

(51) Int. Cl.
*H01R 12/61* (2011.01)
*H01R 13/52* (2006.01)

(52) U.S. Cl.
CPC ......... *H01R 13/5205* (2013.01); *H01R 12/61* (2013.01); *H01R 13/5216* (2013.01); *H01R 13/5221* (2013.01)

(58) Field of Classification Search
CPC .......................... H01R 12/61; H01R 13/5205; H01R 13/5216; H01R 13/5221
See application file for complete search history.

(56) References Cited

U.S. PATENT DOCUMENTS

| | | | | |
|---|---|---|---|---|
| 3,149,896 A | | 9/1964 | Hall | |
| 5,356,308 A | * | 10/1994 | Toba | H01R 13/5219 439/495 |
| 6,064,003 A | * | 5/2000 | Moore | B60R 16/0207 174/662 |
| 2019/0036246 A1 | | 1/2019 | Stone et al. | |

FOREIGN PATENT DOCUMENTS

| | | |
|---|---|---|
| JP | 2003208932 A | 7/2003 |
| KR | 20190048478 A | 5/2019 |

OTHER PUBLICATIONS

European Search Report dated May 18, 2021. 41 pages.

* cited by examiner

*Primary Examiner* — Vanessa Girardi
(74) *Attorney, Agent, or Firm* — RMCK Law Group, PLC

(57) ABSTRACT

A watertight electrical connection system to flat-wire conductors of a flexible circuit is described including a watertight electrical connector that houses connector terminals within a cavity. A contact surface of the watertight electrical connector is configured to mate with a connection area on a surface of the flexible circuit. The connection area is of variable thickness. A seal surrounds an opening to the cavity to form a watertight connection between the connector terminals and one or more of the flat-wire conductors within the connection area on the surface of the flexible circuit. A retainer fits over the flexible circuit and onto the watertight electrical connector to compress the seal and form the watertight connection between the surface of the flexible circuit and the contact surface, which is of variable thickness.

20 Claims, 8 Drawing Sheets

400-1 400-2

WATERTIGHT ELECTRICAL CONNECTION SYSTEM TO FLAT-WIRE CONDUCTORS OF A FLEXIBLE PRINTED CIRCUIT

CROSS-REFERENCE TO RELATED APPLICATION(S)

The present application claims the benefit of U.S. Provisional Application No. 62/956,887, filed on Jan. 3, 2020. The disclosure of this application is incorporated herein by reference in its entirety.

FIELD

The present disclosure generally relates to flexible circuits and, more particularly, to watertight electrical connection systems to flat-wire conductors of a flexible circuit.

BACKGROUND

Flat-wire, flexible circuits provide a lighter and cheaper alternative to traditional wire harnesses for interconnecting electrical circuits of a vehicle. These flexible circuits may consist of flat-wire conductors that are protected by an insulating body. The insulating body exposes the flat-wire conductors at a connection area. An electrical connector attaches to the connection area of the flexible circuit to connect one or more of the flat-wire conductors to an electrical circuit of a vehicle. Without the insulating body there to protect the connection area, the flat-wire conductors within the connection area are susceptible to moisture that may enter the connection area.

SUMMARY

This disclosure describes a watertight electrical connection system to flat-wire conductors of a flexible circuit. Even without the insulating body there to protect the connection area, the flat-wire conductors within the connection area are protected from moisture by a watertight compression seal that contours to the surface of the connection area. The watertight compression seal does not damage or alter the flexible circuit and is reusable.

In some aspects, a watertight electrical connector to flat-wire conductors of a flexible circuit is described. The watertight electrical connector includes a first portion that supports connector terminals and a second portion that houses the connector terminals within a cavity. A contact surface of the second portion is configured to mate with one or more of the flat-wire conductors within a connection area on a surface of the flexible circuit. The watertight electrical connector further includes a seal surrounding an opening to the cavity to form a watertight connection between the connector terminals housed within the cavity and the one or more of the flat-wire conductors within the connection area on the surface of the flexible circuit. The watertight connection is formed when a retainer is fitted over the flexible circuit and attached to the watertight electrical connector to compress the seal and form the watertight connection between the surface of the flexible circuit and the contact surface of the watertight electrical connector.

In other aspects, a watertight electrical connection system to flat-wire conductors of a flexible circuit is described. The watertight electrical connection system includes a watertight electrical connector including a first portion that supports connector terminals and a second portion that houses the connector terminals within a cavity. A contact surface of the second portion is configured to mate with one or more of the flat-wire conductors within a connection area on a surface of the flexible circuit. The watertight electrical connection system further includes a seal surrounding an opening to the cavity to form a watertight connection between the connector terminals housed within the cavity and the one or more of the flat-wire conductors within the connection area on the surface of the flexible circuit. The watertight electrical connection system further includes a retainer that fits over the flexible circuit and onto the second portion of the watertight electrical connector to compress the seal and form the watertight connection between the surface of the flexible circuit and the contact surface of the second portion of the watertight electrical connector.

In further aspects, a system is described including a flexible circuit including one or more flat-wire conductors, and a watertight electrical connection system attached to the flexible circuit forming a connection to one or more of the flat-wire conductors. The watertight electrical connection system includes a watertight electrical connector including a first portion that supports connector terminals and a second portion that houses the connector terminals within a cavity. A contact surface of the second portion is configured to mate with one or more of the flat-wire conductors within a connection area on a surface of the flexible circuit. The watertight electrical connection system further includes a seal surrounding an opening to the cavity to form a watertight connection between the connector terminals housed within the cavity and the one or more of the flat-wire conductors within the connection area on the surface of the flexible circuit. The watertight electrical connection system further including a retainer that fits over the flexible circuit and onto the second portion of the watertight electrical connector to compress the seal and form the watertight connection between the surface of the flexible circuit and the contact surface of the second portion of the watertight electrical connector.

This summary is provided to introduce simplified concepts for watertight electrical connection systems to flat-wire conductors of flexible circuits, which is further described below in the Detailed Description and Drawings. For ease of description, the disclosure focuses on automotive systems; however, the techniques are not limited to automobiles but apply to flexible circuits of other types of vehicles and systems. This summary is not intended to identify essential features of the claimed subject matter, nor is it intended for use in determining the scope of the claimed subject matter.

BRIEF DESCRIPTION OF THE DRAWINGS

The details of one or more aspects of watertight electrical connection systems to flat-wire conductors of flexible circuits are described in this document with reference to the following drawings. The same numbers are used throughout the drawings to reference like features and components:

FIGS. 2-1 through 2-4 illustrate a sequence of states an example watertight electrical connection system is in when connecting to flat-wire conductors of a flexible circuit according to some implementations of the present disclosure;

FIG. 3 illustrates a cross-sectional view of an example watertight electrical connection system when connected to flat-wire conductors of a flexible circuit according to some implementations of the present disclosure;

FIG. 4 illustrates a watertight connection formed within an example watertight electrical connection system for connecting to flat-wire conductors of a flexible circuit according to some implementations of the present disclosure.

DETAILED DESCRIPTION

Figure 1:
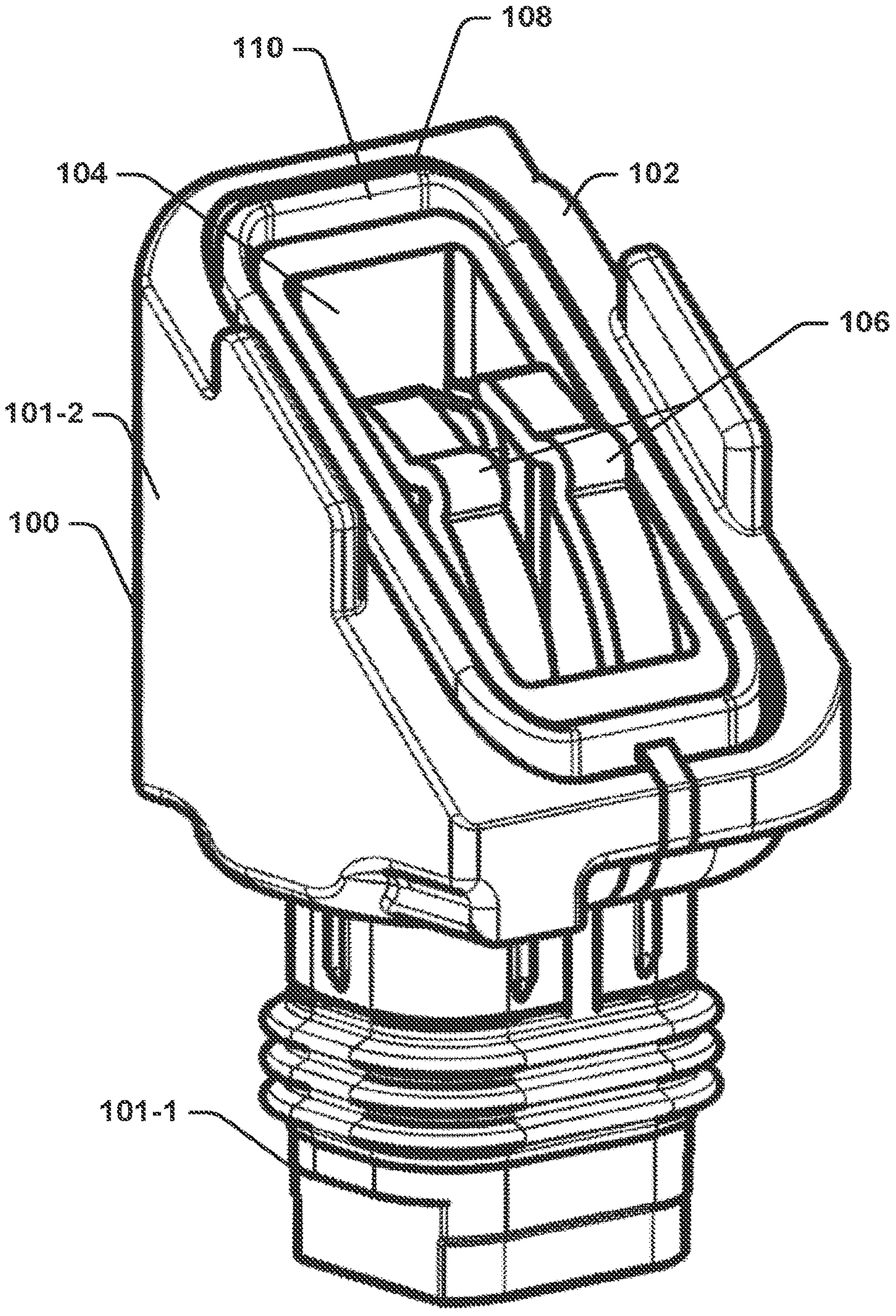
FIG. 1 illustrates an example watertight electrical connector for connecting to flat-wire conductors of a flexible circuit according to some implementations of the present disclosure.

This disclosure describes a watertight electrical connection system to flat-wire conductors of a flexible circuit. While flexible printed circuits are primarily discussed and shown herein, it will be appreciated that the present disclosure is directed to any type of flexible circuit. The conductive circuit traces or "flat-wire conductors" of a flexible circuit, for example, could be applied using any suitable deposition process, including, but not limited to, deposition processes (physical/chemical vapor deposition, sputtering, etc.) and printing processes (screen printing, lithography, inkjet, etc.). An automobile may include many flexible circuits that connect to various types of vehicle electrical circuits, such as lighting systems, climate control systems, automated or assistive driving systems, sensor systems, electrical drive systems, engine control systems, and any other electrical component that connects to a flexible circuit in a vehicle. These flexible circuits include flat-wire conductors made from aluminum or tin-plated copper. The flat-wire conductors are protected by an insulating body formed around the flat-wire conductors. The flexible circuit can have an irregular profile and vary in thickness depending on size and location of the flat-wire conductors it surrounds. For example, areas of the insulating body that surround the flat-wire conductors may be thicker than other areas of the insulating body near the edges or in between conductors where no flat-wires exist.

The insulating body exposes the flat-wire conductors at specific connection areas of the flexible circuit. These connection areas are shaped to accommodate an electrical connector. Seating the electrical connector onto a connection area of a flexible circuit couples connector terminals of the electrical connector to an electric circuit through one or more of the flat-wire conductors of the flexible circuit. Without the insulating body there to protect the connection area, the flat-wire conductors within the connection area are susceptible to moisture that may enter the connection area.

A watertight electrical connection system is described including a watertight electrical connector that houses connector terminals within a cavity. A contact surface of the watertight electrical connector mates with the flat-wire conductors at a connection area on a surface of the flexible circuit. The connection area of the flexible circuit may be of variable thickness in some places. A seal surrounds an opening to the cavity to form a watertight connection between the connector terminals and the flat-wire conductors within the connection area of the flexible circuit. A retainer fits over the flexible circuit and onto the watertight electrical connector to compress the seal to form the watertight connection between the surface of the flexible circuit and the contact surface, which may be of variable thickness. In this way, the connection is impermeable to moisture. Even without the insulating body there to protect the connection area, the flat-wire conductors within the connection area protected from moisture by compression of the seal.

FIG. 1 illustrates an example of a watertight electrical connector 100 for connecting to flat-wire conductors of a flexible circuit. The watertight electrical connector 100 includes a first portion 101-1 that supports connector terminals 106, and a second portion 101-2 that houses the connector terminals 106 within a cavity 104. A contact surface 102 of the second portion 101-2 is configured to mate with one or more of the flat-wire conductors within a connection area on a surface of a flexible circuit.

The connector terminals 106 protrude slightly through an opening of the cavity 104 that passes through the contact surface 102 of the watertight electrical connector 100. A seal 110 surrounds the opening to the cavity 104 to form a watertight connection between the connector terminals 106 housed within the cavity 104 and one or more flat-wire conductors within a connection area on a surface of a flexible circuit (not shown). In some examples, a structure 108 maintains the seal 110 around the opening to the cavity 104 while allowing for lateral expansion of the seal 110 caused by vertical compression of the seal 110 when the seal 110 is compressed by the retainer.

The seal 110 is a silicon ring that is shaped to be larger than the opening to the cavity 104, but smaller than the perimeter of the contact surface 102. The seal 110 is not limited to silicon and may be made from other suitable materials that can compress around the edges of a flexible circuit, adjust to a variable thickness of the flexible circuit, and return to uncompressed form. While the seal 110 may be attached to the contact surface 102, e.g., using an adhesive, the seal 110 does not adhere to the flexible circuit when the watertight electrical connector 100 is attached. That is, the seal 110 does not damage or leave any residue behind when disconnected from the flexible circuit. The seal 110 may be reusable this way.

Figures 1, 2:
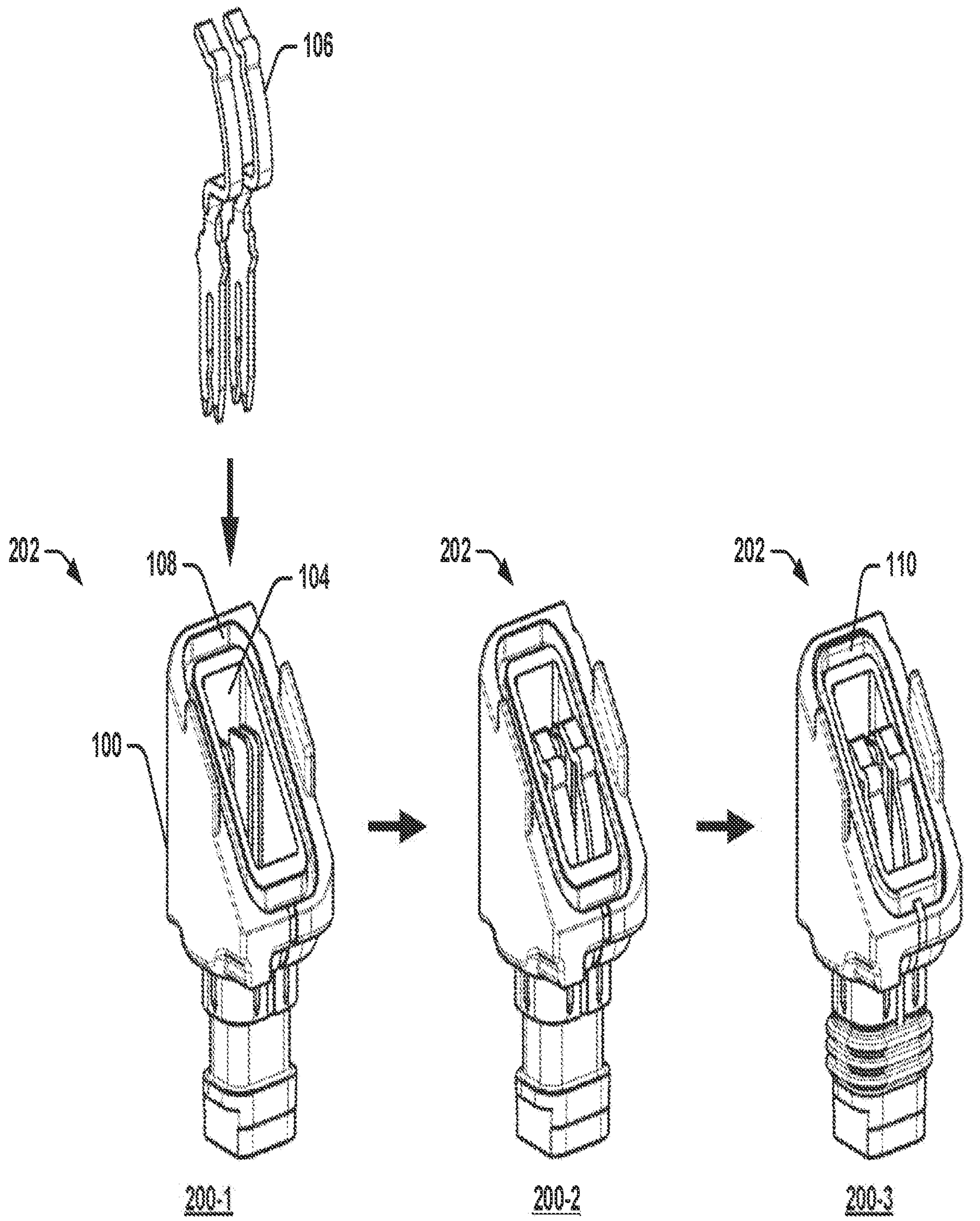
Figure 2:
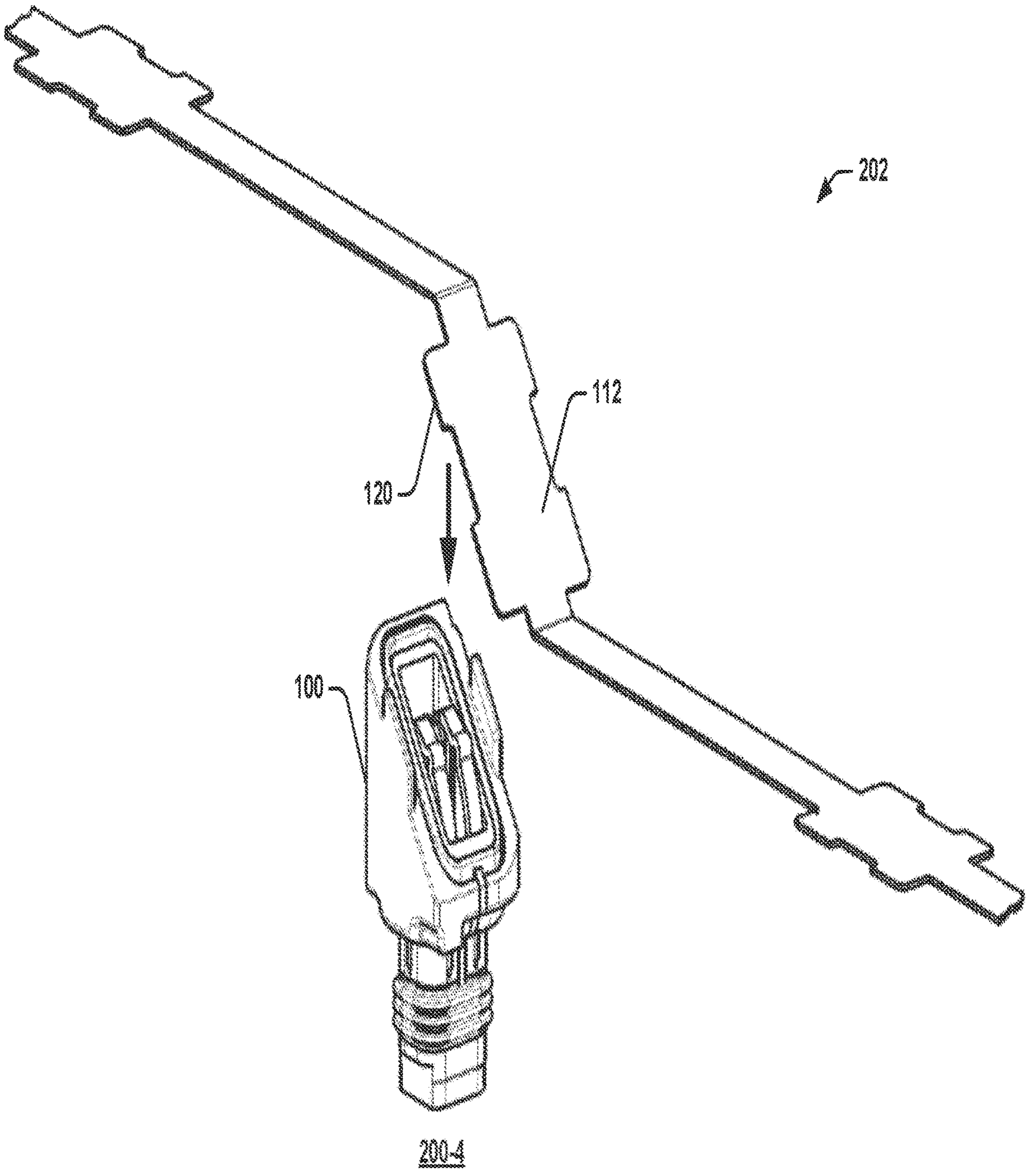

The watertight electrical connector 100 forms a watertight connection when a retainer (not shown) is fitted over the flexible circuit and attached to the watertight electrical connector 100 to compress the seal 110 and form the watertight connection between flat-wire conductors of the flexible circuit and the connector terminals 106 protruding through the contact surface 102. FIGS. 2-1 through 2-4 illustrate a sequence of states 200-1 through 200-6 that an example watertight electrical connection system 202 is in when connecting to flat-wire conductors of a flexible circuit. FIG. 2-1 shows the watertight electrical connection system 202 in state 200-1 where the connector terminals 106 are inserted through a cavity 104 and seated into the watertight electrical connector 100. Once the connector terminals 106 are seated inside the cavity 104, the watertight electrical connection system 202 is in state 200-2.

A seal 110 is inserted within the structure 108 of the watertight electrical connector 100 in state 200-3. The structure 108 may include a groove, a channel, a notch, a cutout, or indentation in the contact surface 102 surrounding the cavity 104. The structure 108 contains the lateral expansion of the seal 110 due to vertical compression caused by a retainer compressing the flexible circuit and the seal 110.

FIG. 2-2 shows the watertight electrical connection system 202 in state 200-4 where the watertight electrical connector 100 is mated to a connection area 120 of a flexible circuit 112. In this state, the connector terminals 106 contact the flat-wire conductors exposed in the connection area 120.

Figures 2, 3:
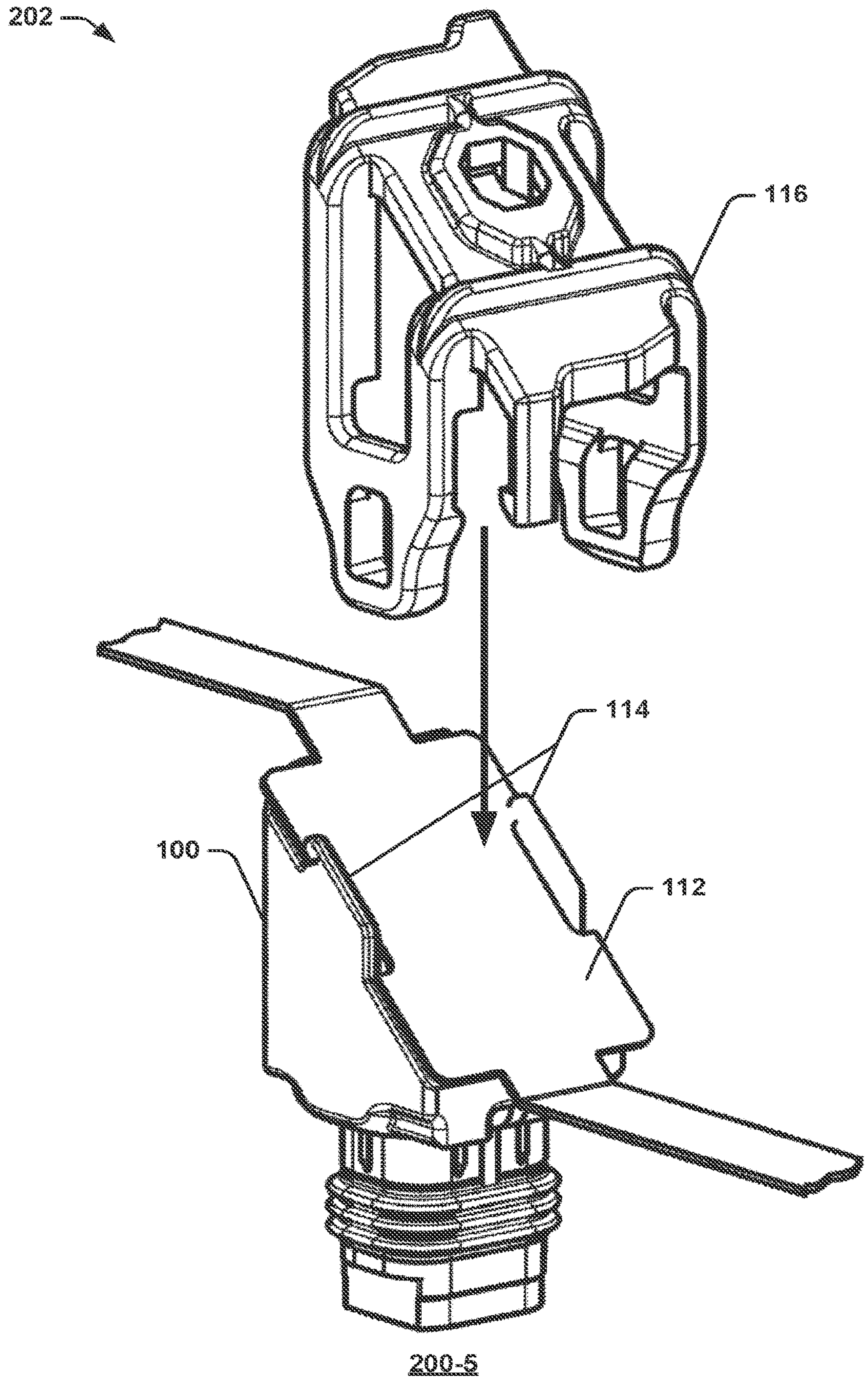

In FIG. 2-3, a retainer 116 is lowered over the flexible circuit 112 and attached to the watertight electrical connector 100 during state 200-5. Protrusions 114 from the contact surface 102 of the watertight electrical connector 100 align the connection area 120 of the flexible circuit 112 with the retainer 116 and the watertight electrical connector 100.

Figures 2, 3, 4:
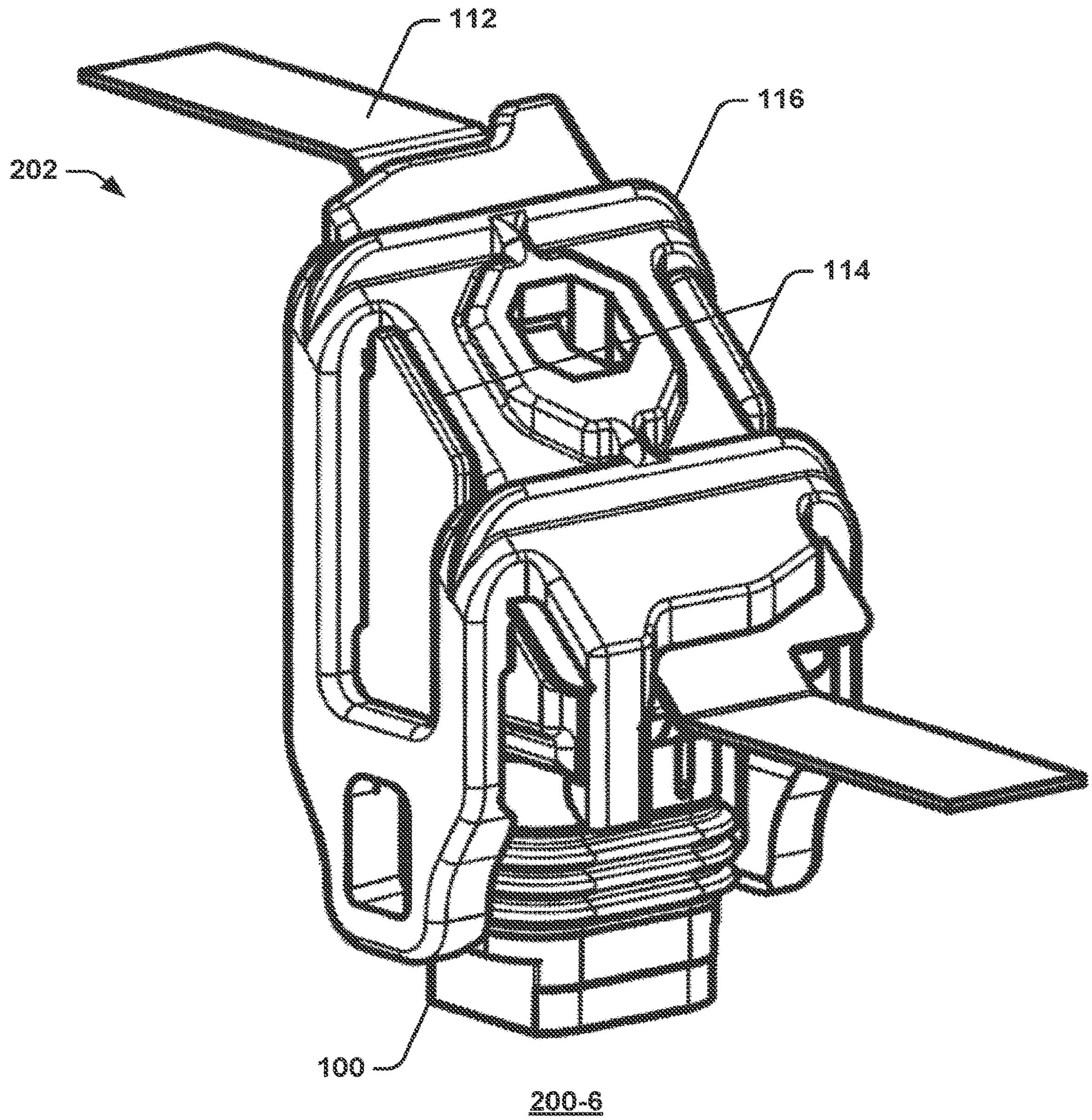
Figure 3:
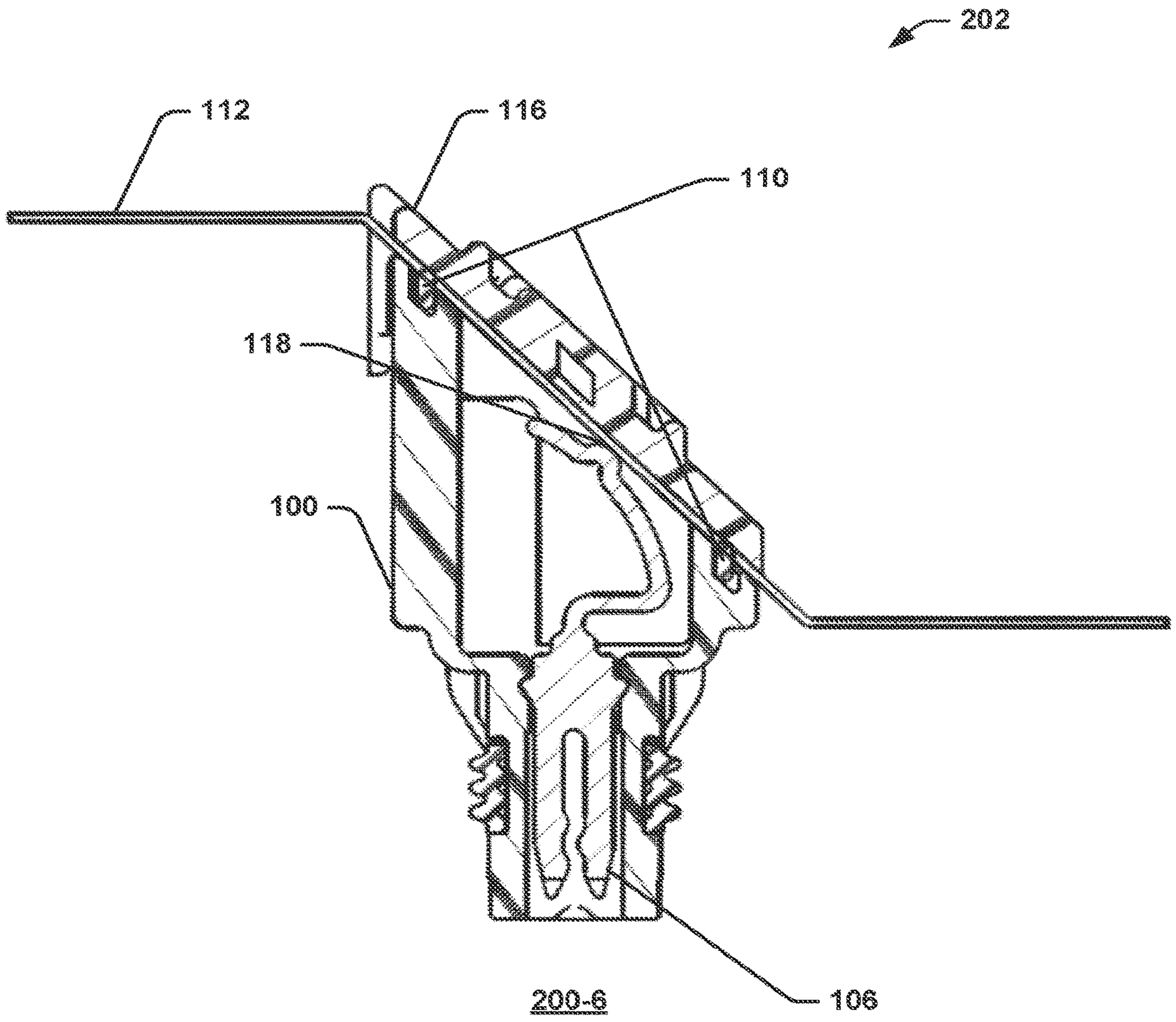
Figure 4:
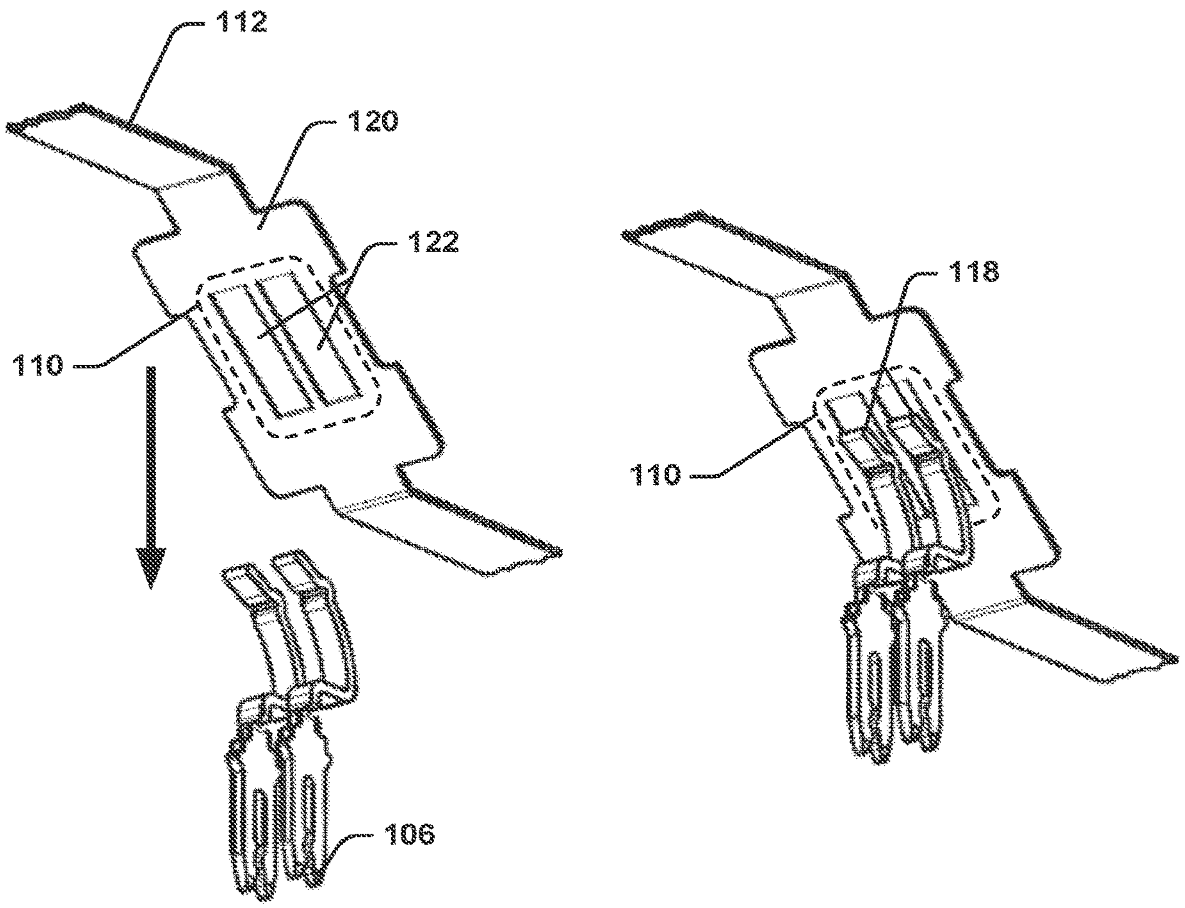

In FIG. 2-4, the watertight electrical connection system 202 is in state 200-6 where the retainer 116 compresses the flexible circuit 112 against the seal 110 seated at the contact surface 102 of the watertight electrical connector 100. The state 200-6 provides a watertight connection between the connector terminals 106 and the flat-wire conductors exposed in the connection area 120. The seal 110 laterally expands due to vertical compression from the force of the retainer 116 pressing on the flexible circuit 112.

FIG. 3 illustrates a cross-sectional view of an example watertight electrical connection system 202 when connected to flat-wire conductors of a flexible circuit. In the example of FIG. 3, the watertight electrical connection system 202 is in the state 200-6 as illustrated in FIG. 2-4. A watertight connection 118 is formed when the retainer 116 is fitted over the flexible circuit 112 and attached to the watertight electrical connector 100. This compresses the seal 110 to make the connection between the flexible circuit 112 and the contact surface 102 of the watertight electrical connector 100 watertight.

FIG. 4 illustrates a watertight connection 118 formed within an example watertight electrical connection system for connecting to flat-wire conductors of a flexible circuit. FIG. 4 illustrates portions of the watertight electrical connection system 202 in two different states.

In a first state 400-1, a connection area 120 exposes the flat-wire conductors 122 that are running through a connection area 120 of the flexible circuit 112. The connection area 120 is aligned with the contact surface 102 of the watertight electrical connector 100. In a second state 400-2, the connection area 120 of the flexible circuit 112 is brought into contact with the seal 110 to form watertight connections 118 around the cavity 104 that houses the connector terminals 106. The retainer 116 squeezes the seal between the connection area 120 of the flexible circuit 112 and the contact surface of the watertight electrical connector 100.

Figure 5:
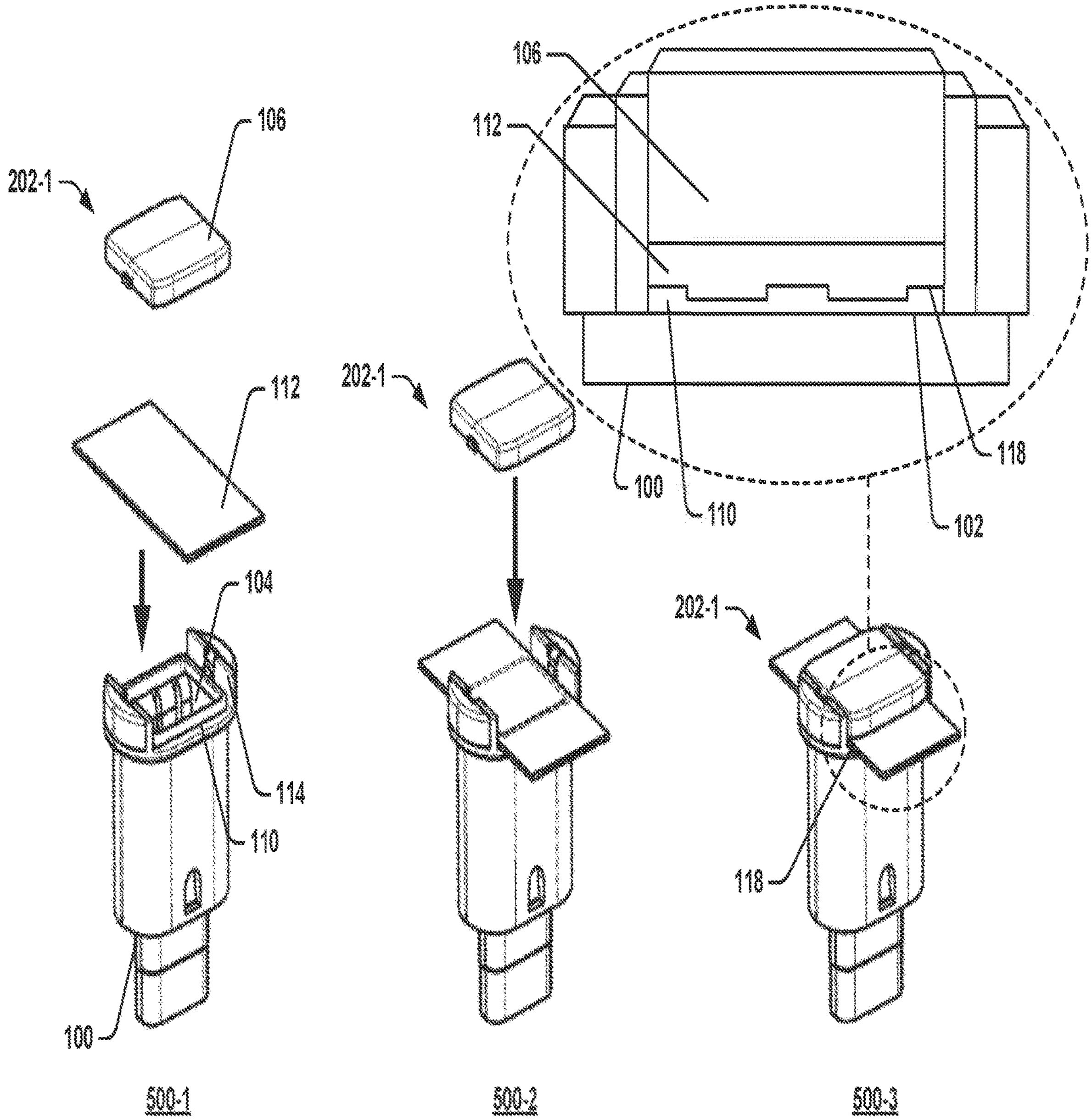
FIG. 5 illustrates an additional example of a watertight electrical connection system for connecting to flat-wire conductors of a flexible circuit according to some implementations of the present disclosure.

FIG. 5 illustrates an additional example of a watertight electrical connection system 202-1 for connecting to flat-wire conductors of a flexible circuit. In state 500-1, the watertight electrical connection system 202-1 is formed by placing the flexible circuit over the cavity of the watertight electrical connector 100 and in contact with the seal 110. In state 500-2, the retainer 116 is attached to the watertight electrical connection system 202-1. The retainer 116 may include tabs that clip into protrusions 114 to hold the retainer 116 in place over the flexible circuit 112. In state 500-3, the watertight electrical connection system 202-1 forms a watertight connection 118, even between the contact surface 102 and portions of the flexible circuit 112 with a variable thickness.

The watertight compression seal 110 does not damage or alter the flexible circuit 112 and is reusable if detached from the flexible circuit 112 and reused elsewhere. With a single compression seal 110 beneath the flexible circuit 112, and the force of the retainer 116 pressing down on the flexible circuit 112, the watertight electrical connection system 202 creates an impermeable watertight connection 118 between a flat or even irregular surface of the flexible circuit 112 (as shown) and the seal 110.

In some implementations of the electrical connector, the spring terminal may be integrated within an electrical device, thereby eliminating the need for the split blade terminal portion of the connector. In yet other implementations of the electrical connector, the split blade terminal portion of the connector may be replaced with a single blade terminal, a pin terminal or a socket terminal.

The following are additional examples of a watertight electrical connection system to flat-wire conductors of a flexible circuit and applicable techniques.

Example 1: A watertight electrical connector for connecting to flat-wire conductors of a flexible circuit, the watertight electrical connector comprising: a first portion that supports connector terminals; a second portion that houses the connector terminals within a cavity, the second portion having a contact surface configured to mate with one or more of the flat-wire conductors within a connection area on a surface of the flexible circuit; and a seal surrounding an opening to the cavity to form a watertight connection between the connector terminals housed within the cavity and the one or more of the flat-wire conductors within the connection area on the surface of the flexible circuit, the watertight connection being formed when a retainer is fitted over the flexible circuit and attached to the watertight electrical connector to compress the seal and form the watertight connection between the surface of the flexible circuit and the contact surface of the watertight electrical connector.

Example 2: The watertight electrical connector of the example 1, wherein the seal comprises a silicon ring.

Example 3: The watertight electrical connector of the example 1 or 2, further comprising: a structure that maintains the seal around the opening to the cavity while allowing for lateral expansion of the seal due to vertical compression of the seal caused by the retainer.

Example 4: The watertight electrical connector of the example 3, wherein the structure is a channel in the contact surface surrounding the cavity, the channel having a depth that is less than a thickness of the seal to ensure contact between the seal and the surface of the flexible circuit during compression.

Example 5: The watertight electrical connector of the example 4, wherein the seal is adhered to the channel and does not adhere to the surface of the flexible circuit.

Example 6: The watertight electrical connector of the example 4, wherein the seal is not adhered to the channel and does not adhere to the surface of the flexible circuit.

Example 7: The watertight electrical connector of any of the examples 1-6, wherein: the surface of the flexible circuit comprises a variable thickness at the connection area; and the seal conforms to the variable thickness of the flexible circuit to form the watertight connection.

Example 8: The watertight electrical connector of any of the examples 1-7, wherein the contact surface comprises outer protrusions that receive the retainer and are configured to contain edges of the flexible circuit to ensure alignment between the connector terminals housed within the cavity and the one or more of the flat-wire conductors within the connection area on the surface of the flexible circuit.

Example 9: The watertight electrical connector of the example 8, wherein the outer protrusions fit within cutouts of the edges of the flexible circuit to ensure alignment between the connector terminals housed within the cavity and the one or more of the flat-wire conductors within the connection area on the surface of the flexible circuit.

Example 10: The watertight electrical connector of any of the examples 1-8, wherein the watertight connection is formed without altering the surface of the flexible circuit based on the seal.

Example 11: A watertight electrical connection system for flat-wire conductors of a flexible circuit, the watertight electrical connection system comprising: a watertight electrical connector comprising: a first portion that supports connector terminals; a second portion that houses the connector terminals within a cavity, a contact surface of the second portion is configured to mate with one or more of the flat-wire conductors within a connection area and on or at a surface of the flexible circuit; and a seal surrounding an opening to the cavity to form a watertight connection between the connector terminals housed within the cavity and the one or more of the flat-wire conductors within the connection area on the surface of the flexible circuit; and a retainer that fits over the flexible circuit and onto the second portion of the watertight electrical connector to compress the seal and form the watertight connection between the surface of the flexible circuit and the contact surface of the second portion of the watertight electrical connector.

Example 12: The watertight electrical connection system of the example 11, wherein the contact surface of the second portion includes a structure that maintains the seal around the opening to the cavity.

Example 13. The watertight electrical connection system of the example 12, wherein the structure comprises a channel that surrounds the opening to the cavity and contains the seal while the seal is compressed by the retainer.

Example 14: The watertight electrical connection system of any of the examples 11 through 13, wherein the seal is adhered to the contact surface and does not adhere to the surface of the flexible circuit.

Example 15: The watertight electrical connection system of example 14, wherein the surface of the flexible circuit comprises a variable thickness at or near the connection area on the surface of the flexible circuit and the seal conforms to the variable thickness under compression from the retainer to form the watertight connection between the connector terminals housed within the cavity and the one or more of the flat-wire conductors within the connection area on the surface of the flexible circuit.

Example 16: The watertight electrical connection system of any of the examples 11 through 15, wherein the opening to the cavity is rectangular or ovular.

Example 17: The watertight electrical connection system of any of the examples 11 through 16, wherein the opening to the cavity is wider than the flexible circuit and part of the retainer forms a watertight interface with the seal at the opening to the cavity.

Example 18. The watertight electrical connection system of the example 17, wherein the seal conforms around edges of the flexible circuit when compressed by the retainer.

Example 19: A system comprising: a flexible circuit including one or more flat-wire conductors; and a watertight electrical connection system attached to the flexible circuit forming a connection to one or more of the one or more flat-wire conductors, the watertight electrical connection system comprising: a watertight electrical connector including: a first portion that supports connector terminals; a second portion that houses the connector terminals within a cavity, a contact surface of the second portion is configured to mate with one or more of the flat-wire conductors within a connection area and on or at a surface of the flexible circuit; and a seal surrounding an opening to the cavity to form a watertight connection between the connector terminals housed within the cavity and the one or more of the flat-wire conductors within the connection area on the surface of the flexible circuit; and a retainer that fits over the flexible circuit and onto the second portion of the watertight electrical connector to compress the seal and form the watertight connection between the surface of the flexible circuit and the contact surface of the second portion of the watertight electrical connector.

Example 20: The system of the example 19, wherein the system comprises a portion of an electrical circuit within a vehicle.

Example 21: The system of the example 20, wherein the vehicle is an automobile.

While various embodiments of the disclosure are described in the foregoing description and shown in the drawings, it is to be understood that this disclosure is not limited thereto but may be variously embodied to practice within the scope of the following claims. From the foregoing description, it will be apparent that various changes may be made without departing from the spirit and scope of the disclosure as defined by the following claims.

What is claimed is:

1. A watertight electrical connector for connecting to flat-wire conductors of a flexible circuit arranged substantially in a first direction and defining both flat and angled portions, the watertight electrical connector comprising:

a first portion that supports angled connector terminals each arranged substantially in a second direction perpendicular to the first direction and defining an angled connector surface;

a second portion that houses the angled connector terminals within a cavity, the second portion having an angled contact surface configured to interface with the angled portion of the flexible circuit to mate one or more of the angled connector surfaces of the angled connector terminals with a respective one or more of the flat-wire conductors within an angled connection area on a surface of the angled portion of the flexible circuit; and a seal surrounding an opening to the cavity to form a watertight connection between the angled connector terminals housed within the cavity and the one or more of the flat-wire conductors within the angled connection area on the surface of the angled portion of the flexible circuit, the watertight connection being formed when an angled retainer is fitted over the angled portion of the flexible circuit and attached to the watertight electrical connector to compress the seal and form the watertight connection between the surface of the angled portion of the flexible circuit and the angled contact surface of the watertight electrical connector, wherein an angle of the angled portion and the angled connection area of the flexible circuit, the angled connector surfaces of the angled connector terminals, the angle contact surface of the second portion, and the angled retainer are each an acute angle relative to both the first and second directions, and wherein the acute angle is substantially greater than zero degrees and substantially less than ninety degrees.

2. The watertight electrical connector of claim 1, wherein the seal comprises a silicon ring.

3. The watertight electrical connector of claim 1, wherein:

the surface of the angled portion the flexible circuit comprises a variable thickness at the angled connection area; and the seal conforms to the variable thickness of the flexible circuit to form the watertight connection.

4. The watertight electrical connector of claim 1, wherein the watertight connection is formed without altering the surface of the angled portion of the flexible circuit based on the seal.

5. The watertight electrical connector of claim 1, wherein the acute angle is approximately 45 degrees.

6. The watertight electrical connector of claim 1, wherein the angled contact surface comprises outer protrusions that receive the angled retainer and are configured to contain edges of the angled portion of the flexible circuit to ensure alignment between the angled connector terminals housed within the cavity and the one or more of the flat-wire conductors within the angled connection area on the surface of the angled portion of the flexible circuit.

7. The watertight electrical connector of claim 6, wherein the outer protrusions fit within cutouts of the edges of the angled portion of the flexible circuit to ensure alignment between the angled connector terminals housed within the cavity and the one or more of the flat-wire conductors within the angled connection area on the surface of the angled portion of the flexible circuit.

8. The watertight electrical connector of claim 1, further comprising:

a structure that maintains the seal around the opening to the cavity while allowing for lateral expansion of the seal due to vertical compression of the seal caused by the angled retainer, wherein the structure is a channel in the contact surface surrounding the cavity, the channel having a depth that is less than a thickness of the seal to ensure contact between the seal and the surface of the angled portion of the flexible circuit during compression.

9. The watertight electrical connector of claim 8, wherein the seal is adhered to the channel and does not adhere to the surface of the angled portion of the flexible circuit.

10. The watertight electrical connector of claim 8, wherein the seal is not adhered to the channel and does not adhere to the surface of the angled portion of the flexible circuit.

11. A watertight electrical connection system for flat-wire conductors of a flexible circuit arranged substantially in a first direction and defining both flat and angled portions, the watertight electrical connection system comprising:

a watertight electrical connector comprising:

a first portion that supports angled connector terminals each arranged substantially in a second direction perpendicular to the first direction and defining an angled connector surface;

a second portion that houses the angled connector terminals within a cavity, an angled contact surface of the second portion configured to interface with the angled portion of the flexible circuit to mate one or more of the angled connector surfaces of the angled connector terminals with a respective one or more of the flat-wire conductors within an angled connection area, and on, or at a surface of the angled portion of the flexible circuit; and a seal surrounding an opening to the cavity to form a watertight connection between the angled connector terminals housed within the cavity and the one or more of the flat-wire conductors within the angled connection area on the surface of the angled portion of the flexible circuit; and an angled retainer that fits over angled portion of the flexible circuit and onto the second portion of the watertight electrical connector to compress the seal and form the watertight connection between the surface of the angled portion of the flexible circuit and the angled contact surface of the second portion of the watertight electrical connector, wherein an angle of the angled portion and the angled connection area of the flexible circuit, the angled connector surfaces of the angled connector terminals, the angled contact surface of the second portion, and the angled retainer are each an acute angle relative to both the first and second directions, and wherein the acute angle is substantially greater than zero degrees and substantially less than ninety degrees.

12. The watertight electrical connection system of claim 11, wherein the angled contact surface of the second portion includes a structure that maintains the seal around the opening to the cavity, wherein the structure comprises a channel that surrounds the opening to the cavity and contains the seal while the seal is compressed by the angled retainer.

13. The watertight electrical connection system of claim 11, wherein the opening to the cavity is rectangular or ovular.

14. The watertight electrical connection system of claim 11, wherein the acute angle is approximately 45 degrees.

15. The watertight electrical connection system of claim 11, wherein the seal is adhered to the angled contact surface and does not adhere to the surface of the angled portion of the flexible circuit.

16. The watertight electrical connection system of claim 15, wherein the surface of the angled portion of the flexible circuit comprises a variable thickness at or near the angled connection area on the surface of the angled portion of the flexible circuit and the seal conforms to the variable thickness under compression from the angled retainer to form the watertight connection between the angled connector terminals housed within the cavity and the one or more of the flat-wire conductors within the angled connection area on the surface of the angled portion of the flexible circuit.

17. The watertight electrical connection system of claim 11, wherein the opening to the cavity is narrower than the angled portion of the flexible circuit and part of the angled retainer forms a watertight interface with the seal at the opening to the cavity.

18. The watertight electrical connection system of claim 17, wherein the seal conforms around edges of the angled portion of the flexible circuit when compressed by the angled retainer.

19. A system comprising:

a flexible circuit including one or more flat-wire conductors arranged substantially in a first direction and defining both flat and angled portions; and a watertight electrical connection system attached to the flexible circuit forming a connection to one or more of the one or more flat-wire conductors, the watertight electrical connection system comprising:

a watertight electrical connector including:

a first portion that supports angled connector terminals each arranged substantially in a second direction perpendicular to the first direction and defining an angled connector surface;

a second portion that houses the angled connector terminals within a cavity, an angled contact surface of the second portion configured to interface with the angled portion of the flexible circuit to mate one or more of the angled connector surfaces of the angled connector terminals with a respective one or more of the flat-wire conductors within an angled connection area, and on, or at a surface of the angled portion of the flexible circuit; and a seal surrounding an opening to the cavity to form a watertight connection between the angled connector terminals housed within the cavity and the one or more of the flat-wire conductors within the angled connection area on the surface of the angled portion of the flexible circuit; and an angled retainer that fits over the angled portion of the flexible circuit and onto the second portion of the watertight electrical connector to compress the seal and form the watertight connection between the surface of the angled portion of the flexible circuit and the angled contact surface of the second portion of the watertight electrical connector, wherein an angle of the angled portion and the angled connection area of the flexible circuit, the angled connector surfaces of the angled connector terminals, the angled contact surface of the second portion, and the angled retainer are each an acute angle relative to both the first and second directions, and wherein the acute angle is substantially greater than zero degrees and substantially less than ninety degrees.

20. The system of claim 19, wherein the acute angle is approximately 45 degrees.

* * * * *